US010626299B2

(12) United States Patent
Pejoan Jiménez et al.

(10) Patent No.: US 10,626,299 B2
(45) Date of Patent: Apr. 21, 2020

(54) FAST AND ELASTIC ADHESIVE

(71) Applicant: AFINITICA TECHNOLOGIES, S. L., Cerdanyola del Vallès (ES)

(72) Inventors: Arnau Pejoan Jiménez, Cerdanyola del Vallès (ES); Verónica De La Fuente Molina, Cerdanyola del Vallès (ES); Ciaran McArdle, Cerdanyola del Vallès (ES)

(73) Assignee: AFINITICA TECHNOLOGIES, S.L., Cerdanyola del Vallès (ES)

( * ) Notice: Subject to any disclaimer, the term of this patent is extended or adjusted under 35 U.S.C. 154(b) by 480 days.

(21) Appl. No.: 15/506,963

(22) PCT Filed: Sep. 3, 2015

(86) PCT No.: PCT/IB2015/056697
§ 371 (c)(1),
(2) Date: Feb. 27, 2017

(87) PCT Pub. No.: WO2016/038514
PCT Pub. Date: Mar. 17, 2016

(65) Prior Publication Data
US 2017/0260422 A1 Sep. 14, 2017

(30) Foreign Application Priority Data
Sep. 12, 2014 (EP) .................... 14382343

(51) Int. Cl.
| B29C 65/00 | (2006.01) |
| B29C 65/48 | (2006.01) |
| B29C 73/02 | (2006.01) |
| B32B 37/00 | (2006.01) |
| C09J 4/00 | (2006.01) |
| C09J 11/04 | (2006.01) |
| C08F 222/32 | (2006.01) |
| C09J 4/06 | (2006.01) |
| C09J 5/00 | (2006.01) |
| C09J 11/06 | (2006.01) |
| C09J 11/08 | (2006.01) |
| B32B 37/12 | (2006.01) |

(52) U.S. Cl.
CPC . *C09J 4/00* (2013.01); *C09J 4/06* (2013.01); *C09J 5/00* (2013.01); *C09J 11/06* (2013.01); *C09J 11/08* (2013.01); *B29C 65/484* (2013.01); *B32B 2037/1261* (2013.01); *C08F 2222/327* (2013.01); *C09J 2433/00* (2013.01)

(58) Field of Classification Search
CPC ....... C09J 4/00; C09J 4/06; C09J 11/00; C09J 11/02; C09J 11/04; C08F 222/00; C08F 222/32; C08F 2222/326; C08F 2222/327; C08F 2222/328; C08L 35/04; B32B 43/00; B32B 27/04; B32B 27/308; B32B 2037/1261; B29C 65/48; B29C 65/484; B29C 73/02

USPC ..... 156/60, 94, 325, 326, 327, 330.9, 331.1, 156/331.2, 331.6, 331.8; 523/118; 524/555, 556; 427/140; 428/63; 525/295; 526/298
See application file for complete search history.

(56) References Cited

U.S. PATENT DOCUMENTS

| 2,784,127 | A | 3/1957 | Joyner et al. |
| 2,794,788 | A | 6/1957 | Coover, Jr. et al. |
| 3,282,773 | A | 11/1966 | Wicker, Jr. et al. |
| 3,572,841 | A | 3/1971 | Rhodes |
| 3,699,127 | A | 10/1972 | O'Sullivan et al. |
| 4,042,442 | A | 8/1977 | Dombroski et al. |
| 4,102,945 | A | 7/1978 | Gleave |
| 4,171,416 | A | 10/1979 | Isowa et al. |
| 4,837,260 | A | 6/1989 | Sato et al. |
| 4,906,317 | A | 3/1990 | Liu |
| 4,980,086 | A | 12/1990 | Hiraiwa et al. |
| 6,617,385 | B1 | 9/2003 | Klauck et al. |
| 2010/0006208 | A1 | 1/2010 | Attarwala et al. |
| 2010/0030258 | A1* | 2/2010 | Badejo ...................... C09J 4/00 606/214 |
| 2011/0196092 | A1* | 8/2011 | Hally ...................... C08L 35/04 524/710 |

(Continued)

FOREIGN PATENT DOCUMENTS

| DE | 102008033378 A1 | 1/2010 |
| EP | 0239890 A | 10/1987 |
| EP | 0323720 A | 7/1989 |

(Continued)

OTHER PUBLICATIONS

International Search Report dated Oct. 20, 2015 from corresponding International Application No. PCT/IB2015/056697; 4 pgs.
S. Ebnesajjad Ed., Adhesives Technology Handbook, William Andrew, Norwich, 2008; 387 pgs.
Mirzrahi et al., Elasticity and safety of alkoxyethyl cyanoacrylate tissue adhesives, Acta Biomat., 2011, 7(8), 3150-3157; 8 pgs.

*Primary Examiner* — Philip C Tucker
*Assistant Examiner* — Brian R Slawski
(74) *Attorney, Agent, or Firm* — Maier & Maier, PLLC

(57) ABSTRACT

The present invention relates to a fast and elastic adhesive. Said adhesive includes two components, one including a monomer having an alkoxyalkyl ester group, a thickener, a thixotropic agent and a stabilizing agent. In the other component, a plasticizing agent, a thixotropic agent, and an initiating agent are included. This adhesive can be used to practically instantaneously bond substrates that can move relative to one another, or which may be bent or have the ability to absorb an impact, or to seal.

15 Claims, No Drawings

(56) References Cited

U.S. PATENT DOCUMENTS

2014/0275419 A1* 9/2014 Ward .................. C09J 135/04
524/879

FOREIGN PATENT DOCUMENTS

| ES | 2534727 A1 | 4/2015 |
|----|------------|--------|
| KR | 2012-0128004 A | 11/2012 |
| KR | 2012-0131802 A | 12/2012 |
| WO | 01/12243 A1 | 2/2001 |
| WO | 2004/061030 A1 | 7/2004 |
| WO | 2010046412 A1 | 4/2010 |
| WO | 2012035112 A1 | 3/2012 |
| WO | 2014140804 A2 | 9/2014 |

* cited by examiner

FAST AND ELASTIC ADHESIVE

TECHNICAL FIELD

The present invention relates to a fast and elastic two component adhesive, which is also low odour, and is used for bonding substrates requiring a certain degree of flexibility, as well as for sealing joints.

TECHNICAL BACKGROUND

Cyanoacrylate is the generic name for a family of resistant, fast acting adhesives based on esters of 2-cyanoacrylic acid. The structure of the monomer is as follows:

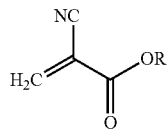

wherein R is usually an alkyl group such as, for example, methyl, ethyl, butyl, or octyl, or an alkoxyalkyl group, for example, 2-methoxymethyl or 2-ethoxyethyl.

Such compounds have been well known for some time, as described in, for example, S. Ebnesajjad Ed., *Adhesives Technology Handbook*, William Andrew, Norwich, 2008.

Other monomers which are also used as fast acting adhesives are methylidene malonates, as those described in the Korean patent applications KR-A-2012-0128004 and KR-A-2012-0131802.

In many industrial and domestic applications these compounds are used in form of one-component, as they polymerize rapidly when they form a thin film between two substrates in the presence of anions or nucleophilic species. The speed at which the bond is formed and the ease of use have contributed to their popularity.

Cyanoacrylate monomers are generally low viscosity liquids at room temperature, although solid monomers are also known as, for example, neopentyl cyanoacrylate.

Liquid compositions of these monomers have some drawbacks, as they are not suited for applying the adhesive on vertical or inclined surfaces, as they sag. They also show difficulties for bonding porous surfaces since the liquid adhesive is absorbed into them. With the inclusion of organic polymers or inorganic fillers as thickeners, the preparation of thixotropic adhesives that do not sag from inclined surfaces has been described.

In general, it is considered that cyanoacrylates are brittle materials once cured. At least, this is the case for the methyl and ethyl esters, which form glassy polymers with a glass transition temperature higher than 160° C. As the chain length of the ester group increases, the cyanoacrylate becomes more flexible. Thus, for example, n-butyl and 2-octyl cyanoacrylates are used for skin closures, where the flexibility is important, without the use of sutures.

In prior art, the use of plasticizers has been described to improve the fragility of cyanoacrylates, for example, in the U.S. Pat. No. 2,784,127. In particular, alkyl esters of mono- or dicarboxylic acids, and aliphatic or aromatic phosphonates are disclosed. In the European patent application EP-A-0239890 adhesive compositions are described that include a semicompatible plasticizer, that is, completely compatible with the cyanoacrylate monomer, but incompatible with the cyanoacrylate polymer. This plasticizer is, for example, partially hydrogenated terphenyl, or triethylene glycol di-2-ethylhexanoate.

The adhesives derived from monomers comprising an ester of the alkoxyalkyl type are more flexible than those derived from short chain $C_1$-$C_4$ alkyl cyanoacrylates, as described, for example, in the European patent application EP-A-0323720 or in Mirzrahi et al., *Elasticity and safety of alkoxyethyl cyanoacrylatetissue adhesives*, Acta Biomat., 2011, 7(8), 3150-3157.

It is important to point out that flexibility is not the same property as elasticity. For example, paper is flexible, but is not elastic, while silicones, rubbers and natural rubber can be both flexible and elastic. Elasticity is a property of the solid bodies, by which they more or less completely recover its extension and shape as soon as the action of the force that distorted them stops. The materials that are flexible and elastic may be strong or weak, and are characterized by the load they can support during the extension, the resistance against breaking and the Young's Modulus.

Elastic adhesives are important in applications where the substrates to be bonded can be easily broken by impact or shock, or where some freedom for substrates to move relative to one another is needed because of differences in linear expansion coefficients, especially for bonding large pieces that experience cyclic fluctuations in temperature on a regular basis.

Elastic adhesives not only allow the bonding of substrates, but they can also perform a sealing function, which also requires the curing in volume in relatively thick sections.

Commercial elastic adhesives are generally silicone polymers, occasionally epoxy modified, such as, for example, the CEMEDINE® PM series, which can reach up to 200% elongation, or THREEBOND® 1220, 1530 and 3950. While silicone adhesives are suitable for bonding substrates and mass curing for effective sealing, they are slow curing, as the curing time can be from several hours to one day, and they often release toxic or corrosive by-products during the curing.

As stated above, the adhesives comprising monomers of the alkoxyalkyl type are more flexible, and in prior art one-component gel adhesives have been described containing them. They have the advantage of being odourless, non-lachrymatory and non-irritant. In Mirzrahi et al., op. cit., it has also been suggested that polymers cured from these monomers are elastic, if they are in the form of a thin layer.

Thus, there remains the need of having flexible and elastic adhesives of fast curing in volume for solving bonding and sealing problems, both permanent and temporary, and that also do not have odour, are non-lachrymatory and non-irritant, and do not produce white deposits on the substrates to be bonded.

OBJECT OF THE INVENTION

The object of the present invention is a cyanoacrylate composition.

Also part of the object of the invention is an adhesive comprising this cyanoacrylate composition.

Also part of the object of the invention is a syringe or a cartridge comprising the cyanoacrylate composition.

Also part of the object of the invention is a bonding/repair/sealing method.

Also part of the object of the invention is an elastic material obtainable according to this method.

Also part of the object of the invention is the use of the cyanoacrylate composition.

DETAILED DESCRIPTION OF THE INVENTION

The object of the present invention is a cyanoacrylate composition comprising:
1) a component A comprising:
a. a compound of general formula (I)

wherein
A is selected from the group consisting of CN, $CO_2Me$ and $CO_2Et$, and
D is a group defined by the general formula (II)

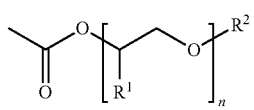

wherein
$R^1$ is selected from the group consisting of H and Me,
$R^2$ is selected from the group consisting of $Si(Me_3)_3$, and a $C_1$-$C_6$ linear or branched alkyl chain, and
n is comprised between 1 and 3,
optionally combined with a compound of general formula (III)

wherein
E is selected from the group consisting of CN, $CO_2Me$ and $CO_2Et$, and
G is a carboxylic ester moiety $CO_2R^3$, wherein $R^3$ is selected from the group consisting of: $C_1$-$C_{18}$ linear or branched alkyl chain, trimethylsilylated $C_1$-$C_3$ alkyl chain, allyl, propargyl, cyclohexyl, cyclohexenyl, methylcyclohexyl, methylcyclohexenyl, ethylcyclohexyl, ethylcyclohexenyl, furfuryl, phenylethyl, phenoxyethyl, and acrylic ester moiety.
b. a thickener,
c. a thixotropic agent selected from the group consisting of hydrogenated castor oil, hydrogenated castor oil modified by reaction with an amine, polyamides, and silica,
d. a stabilizing agent, and
2) a component B comprising:
a. a plasticizing agent selected from the group consisting of esters of $C_2$-$C_4$ carboxylic acids with $C_2$-$C_5$ alkyl alcohols having 2-4 hydroxyl groups,
b. an initiating agent, and
c. a thixotropic agent selected from the group consisting of hydrogenated castor oil, hydrogenated castor oil modified by reaction with an amine, polyamides, and silica.

The authors of the present invention have developed a cyanoacrylate composition which allows the preparation of an elastic fast-curing adhesive that cures in volume, so that its elastic properties can be modulated according to the composition to adapt to the technical requirements of the bonding. This composition includes a monomer that has an alkoxyalkyl ester, which is non-irritating, non-lachrymatory, is practically odourless, and does not produce white deposits on the substrate to be bonded.

In the present description, as well as in the claims, the singular forms "a" and "an" include also the plural reference, unless the context clearly indicates otherwise.

In this description, the percentages (%) are expressed by weight based on the total weight of component A or component B, unless otherwise indicated, and in the compositions, the sum of the percentages of the different ingredients of component A or component B are adjusted to add up to 100%.

In the context of the invention the term "cyanoacrylate" includes cyanoacrylates, compounds of general formula (I) wherein A is the CN group, and methylidene malonates, wherein A is the $CO_2Me$ or $CO_2Et$ group.

In the context of the invention, an elastic material means a material having an elongation at break not less than 175%, a Young's Modulus not higher than 6 MPa and that recovers its original dimensions when subjected to a tensile stress below the elongation at break.

Component A

The component A is a composition comprising the rapid polymerization monomer, a thickener, a thixotropic agent, and a stabilizing agent. It can further include other optional components such as a plasticizing agent, an adhesion promoter, a filler, or mixtures thereof. When the thixotropic agent is organic, the component A can further include an accelerating agent.

Monomers: Compounds of General Formula (I) and (III)

The component A includes a compound of general formula (I), mentioned above, which is a monomer that polymerizes rapidly because the groups A and D polarize the molecule making it susceptible to a nucleophilic attack. This monomer is substantially odour-free, this means that either it has zero odours, or that its odour is very low.

When A is the CN group, is a cyanoacrylate; when A is the $CO_2Me$ group, is methylidene malonate methyl ester, and when A is the $CO_2Et$ group, is methylidene malonate ethyl ester.

The esters of general formula (II) can be defined generically as alkoxyalkyl esters, among which the following can be mentioned: 2-methoxyethyl, 2-ethoxyethyl, 2-propoxyethyl, 2-butoxyethyl, 2-isopropoxyethyl, 2-hexyloxyethyl, 2-amyloxyethyl, 2-ethoxybutyl, 2-methoxypropyl, and 2-(1-methoxy)propyl, among others. Other examples of alkoxyalkyl type monomers are described in the U.S. Pat. No. 6,977,278.

In a preferred embodiment, in the compound of general formula (I), A is the CN group. In another preferred embodiment $R^1$ is H and $R^2$ is Me or Et. In another preferred embodiment n is 1. In a more preferred embodiment A is the CN group, $R^1$ is H, $R^2$ is Me or Et, and n is 1, that is, in this more preferred embodiment the compound of general formula (I) is 2-methoxyethyl cyanoacrylate or 2-ethoxyethyl cyanoacrylate. In another preferred embodiment A is the CN group, $R^1$ is Me, $R^2$ is Me, and n is 1, that is, the compound of general formula (I) is 2-(1-methoxy)propyl cyanoacrylate.

Optionally, the adhesive of the invention includes a compound of general formula (III), mentioned above, which is a monomer that rapidly polymerizes because the groups E and G polarize the molecule making it susceptible to a nucleophilic attack. Preferably E is CN.

When $R^3$ is an acrylic ester moiety, it means a compound of formula (IV):

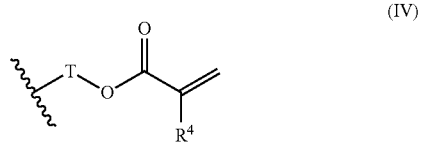

wherein T is: $(CH_2)_z$, wherein z is comprised between 2 and 12, preferably between 2 and 8, and more preferably 2 and 6; $C_3$-$C_{12}$ branched alkyl chain, preferably $C_3$-$C_8$, and more preferably $C_3$-$C_6$; cyclohexyl; bisphenyl; bisphenol, and $R^4$ is H, Me, CN or $CO_2R^5$, wherein $R^5$ is a $C_1$-$C_{10}$ alkyl group. When $R^4$ is H or Me, is an acrylate or methacrylate moiety, respectively. When $R^4$ is CN is a cyanoacrylate moiety. An example is 1,6-hexyl biscyanoacrylate, wherein in the compound of general formula (III), E is CN.

This monomer may be substantially odour-free, low odour or may have an odour. In the context of the invention, within the monomers substantially odour-free or low odour are also included those monomers which are not lachrymatory, and those whose vapours do not polymerize, so that they do not produce white deposits on the substrates to be bonded. These features are associated with low vapour pressures. Thus, for example, when $R^3$ in the compound of general formula (III) is 2-ethylhexyl, furfuryl, cyclohexyl, cyclohexenyl, trimethylsilylmethyl or trimethylsilylethyl, the monomer is substantially odour-free or low odour.

In the case that the optional monomer of general formula (III) has a certain odour, its amount should not significantly influence the overall volatility of the composition. The possible presence of this monomer of general formula (III) may be desirable for a variety of reasons such as, for example, the following: the addition of small amounts of ethyl cyanoacrylate is suitable to optimise cost or modulate reactivity; the inclusion of butyl or 2-ethylhexyl cyanoacrylate enhances the solvency for additional components; cross-linking may be achieved by bifunctional cyanoacrylates; adjusting glass transition temperature can be performed by adding 2-octyl cyanoacrylate, and for enhancing hydrophobicity partially fluorinated or silylated alkyl cyanoacrylates may be added. The adhesive of the invention can include the combination of two or more monomers to adjust its applicative properties.

In a preferred embodiment, in the compound of general formula (III), E is the CN group. In another preferred embodiment G is a carboxylic ester moiety $CO_2R^3$, wherein $R^3$ is selected from the group consisting of: $C_1$-$C_{18}$ straight or branched alkyl chain, trimethylsilylated $C_1$-$C_3$ alkyl chain, cyclohexyl, cyclohexenyl, and furfuryl, more preferably from Me, Et, i-Pr, Bu, 2-ethylhexyl, and 2-octyl.

In another more preferred embodiment, the adhesive of the invention comprises a compound of general formula (III) in which E is the CN group, and G is a carboxylic ester moiety $CO_2R^3$, wherein $R^3$ is selected from the group consisting of Me, Et, i-Pr, Bu, 2-ethylhexyl, and 2-octyl.

The monomers used in the adhesive of the invention can be obtained, for example, according to the method described in the U.S. Pat. No. 6,245,933 and the references mentioned therein, or with the method described in the European patent application EP14382127.0.

Thickener

A suitable thickening agent for component A can be selected from those which are compatible with the monomers that it contains. Among them can be mentioned poly (meth)acrylates, acylated cellulose polymers, for example cellulose acetate, polyvinyl acetates, partially hydrolysed polyvinyl acetates, polyvinylpyrrolidones, polyoxylates, polycaprolactones, polycyanoacrylates, vinyl acetate copolymers, for example, with vinyl chloride, copolymers of (meth)acrylates with butadiene and styrene, copolymers of vinyl chloride and acrylonitrile, copolymers of ethylene and vinyl acetate, poly[butyleneterephthalate-co-polyethyleneglycolterephthalate] and copolymers of lactic acid and caprolactone.

These thickening agents are well known to the skilled in the art and have been described in the prior art. Thus, for example, poly(meth)acrylates are disclosed in the U.S. Pat. No. 3,282,773, U.S. Pat. No. 3,572,841 and U.S. Pat. No. 3,692,752; copolymers of (meth)acrylates with butadiene and styrene, and copolymers of vinyl chloride and acrylonitrile in the U.S. Pat. No. 4,102,945; polyoxylates (polyesters of oxalic acid), polycaprolactones and copolymers of lactic acid and caprolactone in the international patent application WO-A-01/12243; poly[butyleneterephthalate-co-polyethyleneglycolterephthalate] polymer in the international patent application WO-A-2007/049258, polycyanoacrylates in U.S. Pat. No. 2,794,788; the acylated cellulose polymers in the U.S. Pat. No. 3,699,127, and copolymers of vinyl acetate and vinyl chloride in the international patent application WO-A-2004/061030.

Preferably, in the adhesive of the invention the thickener is selected from the group consisting of poly(meth)acrylates, polyvinylpyrrolidones, polyvinyl acetates, partially hydrolysed polyvinyl acetates, vinyl acetate copolymers, and acylated cellulose polymers; more preferably is a poly(meth)acrylate, still more preferably is methyl polymethacrylate, and still more preferably is methyl polymethacrylate with an average molecular weight comprised between 400,000 and 500,000.

The thickener should be dry and substantially free of peroxides to prevent a premature polymerization of the monomer, as described in the European patent application EP-A-0323720.

In component A, the thickener is usually present in a percentage comprised between 2% and 8% by weight, preferably between 4 and 6% by weight based on the total weight of component A.

Thixotropic Agent

The component A comprises a thixotropic agent, organic or inorganic, selected from the group consisting of hydrogenated castor oil, hydrogenated castor oil modified by reaction with an amine, polyamides, and silica.

Silica is an inorganic thixotropic agent, and can be selected from the group consisting of fumed silica, hydrophobic fumed silica, hydrophilic fumed silica and precipitated silica.

Preferably the thixotropic agent is selected from the group consisting of hydrogenated castor oil, hydrogenated castor oil modified by reaction with an amine and hydrophobic fumed silica.

The modified castor oil is preferably the product resulting from the reaction between hydrogenated castor oil and an aliphatic diamine, more preferably selected from the group consisting of 1,2-ethanediamine, 1,3-propanediamine and 1,6-hexanediamine, and still more preferably is 1,2-ethanediamine.

The product of the reaction between hydrogenated castor oil and an amine is a complex mixture comprising glycerides and amides, and is substantially free of diamine to avoid stability problems in the adhesive.

The hydrogenated castor oil is commercially available in micronized form under the trade name THIXIN® R (Elementis Specialties), or CRAYVALLAC® ANTISETTLE CVP (Arkema).

The modified hydrogenated castor oil is commercially available, for example, under the trade name EFKA® RM 1900 or 1920 (BASF) in micronized powder form with a mean particle size comprised between 5 and 9 µm; CRAYVALLAC® SF or MT (Arkema), or under the trade name THIXATROL® ST (Elementis Specialties), when the amine is 1,2-ethanediamine.

In the adhesive of the invention the thixotropic agent is preferably selected from the group consisting of hydrogenated castor oil, THIXATROL® ST, EFKA® RM 1900 or EFKA® RM 1920, CRAYVALLAC® SF and CRAYVALLAC® MT, and more preferably is EFKA® RM 1900 or EFKA® RM 1920, which is well known to the skilled in the art in the field of polymers, such as paints, varnishes and adhesives.

Polyamides are thixotropic agents also well known to the skilled in the art. They are commercially available under the trade name THIXATROL® (Elementis Specialties) and DISPARLON® (Kusumoto Chemicals). Polyamides may require to be activated, that is, dispersed and solvated in the composition, by the action of heat before providing the thixotropic effect. Among them can be mentioned, for example, the polyamides THIXATROL® MAX, DISPARLON® 6100, 6200, 6500, 6600, 6650 or 6750. The activation temperature is provided by the supplier of the polyamide, being generally comprised between 30° C. and 100° C. In other cases, the polyamide is pre-activated or it may be pre-activated and may be dispersed directly in the composition, and does not require the action of heat to confer thixotropy to the system. Among them can be mentioned, for example, DISPARLON® A603-20x, A650-20X, A670-20M, A671-EZ, 6900-20X, or F-9030.

In the component A, the organic thixotropic agent is generally present in an amount comprised between 2% and 6% by weight, preferably between 2.5% and 5% by weight.

Hydrophilic fumed silica is commercially available, for example, as AEROSIL® 90, 130, 200 or 380 (Evonik), hydrophobic fumed silica as AEROSIL® R104, R202, R208, R816 or R974 (Evonik), precipitated silica as EBROSIL® PD/GR, S-125PD/GR or SA-60 (IQE), and fumed silica as CAB-O-SIL® CT-1111 G, HP-60, or HS-5 (Cabot).

In component A, the silica is generally present in an amount comprised between 3.5% and 5% by weight, more preferably between 3.8% and 4.5% by weight based on the total weight of component A. The hydrophobic fumed silica can be included in component A, when it does not comprise an accelerating agent.

Stabilizing Agent

Component A comprises a stabilizing agent selected from the group consisting of radical stabilizing agents, acid stabilizing agents, and mixtures thereof.

The radical stabilizers help to prevent premature polymerization due to radical mechanisms, while the acid stabilizers, also known as anionic stabilizers, help to prevent premature polymerization of the adhesive due to anionic mechanisms. Among the acid stabilizers are those that stabilize in vapour phase to prevent the polymerization of the monomer in the empty space of the containers.

The radical stabilizing agents are radical polymerization inhibitors, and are preferably selected from the group consisting of 4-methoxyphenol, hydroquinone, hydroquinone monomethyl ether, hydroxytoluene butyl ether, hydroxyanisole butyl ether, 2,2'-methylene-bis-(6-tert-butyl-4-methylphenol), and mixtures thereof; more preferably from hydroquinone monomethyl ether, 2,2'-methylene-bis-(6-tert-butyl-4-methylphenol), and mixtures thereof.

In the component A, the content of the radical stabilizing agent is generally comprised between 0.03% and 0.7% by weight. In the case of using hydroquinone monomethyl ether, it is preferably used in a range comprised between 0.03% and 0.07% by weight, more preferably between 0.04% and 0.06% by weight based on the total weight of component A, and 2,2'-methylene-bis-(6-tert-butyl-4-methylphenol) is preferably used in a range comprised between 0.3% and 0.7% by weight, and more preferably between 0.4% and 0.6% by weight based on the total weight of component A.

The acid stabilizing agents are inhibitors of anionic polymerization, and are selected from the group consisting of Bronsted acids, Lewis acids, and mixtures thereof. The acid stabilizing agents are selected preferably from the group consisting of methanesulfonic acid, p-toluenesulfonic acid, p-toluenesulfonic acid anhydride, boron trifluoride, boron trifluoride etherate complex, sulfur dioxide, and mixtures thereof, more preferably from boron trifluoride etherate complex, sulfur dioxide, and mixtures thereof, and still more preferably is boron trifluoride etherate, alone or in combination with sulfur dioxide.

In the component A, the content of acid stabilizing agent is generally comprised between 0.0004% and 0.0037% by weight, equivalent to 4 and 37 ppm respectively, based on the total weight of component A.

In an especially preferred embodiment of the adhesive, in the component A the stabilizing agent is a combination of boron trifluoride etherate complex, alone or in combination with sulfur dioxide, as acid stabilizing agent, and hydroquinone monomethyl ether, 2,2'-methylene-bis-(6-tert-butyl-4-methylphenol) or mixtures thereof, as radical stabilizing agent; being more preferred the combination of between 0.0004% and 0.0012% by weight, equivalent to 4 and 12 ppm respectively, more preferably between 0.0005% and 0.001% by weight, equivalent to 5 and 10 ppm respectively, of boron trifluoride etherate complex based on the total weight of component A, optionally combined with between 0.0008% and 0.003% by weight, equivalent to 8 and 30 ppm respectively, preferably between 0.0015% and 0.0025% by weight, equivalent to 15 and 25 ppm respectively, of sulfur dioxide based on the total weight of component A, as acid stabilizing agent, and between 0.03% and 0.07% by weight, more preferably between 0.04% and 0.06% by weight of hydroquinone monomethyl ether, between 0.3% and 0.7% by weight, preferably between 0.4% and 0.6% by weight of 2,2'-methylene-bis-(6-tert-butyl-4-methylphenol) based on the total weight of component A, or mixtures thereof, as radical stabilizing agent.

In the component A, methanesulfonic acid can be used as acid stabilizing agent, preferably between 0.0005% and 0.0018% by weight, more preferably between 0.00075% and 0.0016% by weight, based on the total weight of component A, in combination with sulfur dioxide, preferably between 0.0008% and 0.003% by weight, and more preferably between 0.0015% and 0.0025% by weight, based on the total weight of component A.

Plasticizing Agent

The component A can further comprise a plasticizing agent.

Plasticizers suited for use in compositions containing cyanoacrylates are described in the international patent application WO-A-2010/046412. Among them can be mentioned: acetates such as triacetin; phthalates, such as dioctyl phthalate; trimellitates such as trioctyl trimellitate; adipates such as dimethyl adipate; and benzoates such as diethylene glycol dibenzoate.

The plasticizers to be used in the adhesive of the invention are selected from the group consisting of esters of $C_2$-$C_4$ carboxylic acids with $C_2$-$C_5$ alkyl alcohols having 2-4 hydroxyl groups, for example, ethylene glycol, propylene glycol, glycerine, trimethylolpropane, or pentaerythritol, optionally ethoxylated, preferably from acetates of $C_2$-$C_5$ alkyl alcohols having 2-4 hydroxyl groups, optionally ethoxylated, and more preferably from acetates of $C_2$-$C_3$ alkyl alcohols having 2-3 hydroxyl groups, such as, for example, glycerine triacetate or ethylene glycol diacetate.

Preferably the plasticizing agent is selected from triacetin and ethylene glycol acetate.

These plasticizers are commercially available, for example, through the company Oleon Chemicals (Netherlands).

In the case of being present, the plasticizing agent in component A is usually present in a percentage comprised between 10% and 20% by weight, preferably between 15% and 18% by weight, based on the total weight of component A.

Preferably, a plasticizing agent is not included in component A.

Occasionally, the plasticizing agent may be replaced in the adhesive by the use of a monomer of general formula (III) which is internally plasticized such as, for example, 2-ethylhexyl cyanoacrylate.

Filler

The component A may also further include a non-reactive filler such as, for example, low density polyethylene powder, polyvinylidene fluoride (PVDF), or polytetrafluoroethylene (PTFE).

Usually the filler content in component A is comprised between 2% and 4% by weight based on the total weight of component A.

Adhesion Promoter

The component A may further include an adhesion promoter for glass, ceramics, porcelain, plastics and/or metal, for example, alkoxysilane compounds.

Usually the content of the adhesion promoter in the component A is comprised between 0.05% and 0.1% by weight, preferably between 0.06% and 0.08% by weight, based on the total weight of component A.

Accelerating Agent

In a preferred embodiment, the component A comprises a thixotropic agent selected from the group consisting of hydrogenated castor oil, hydrogenated castor oil modified by reaction with an amine, and polyamides, in combination with an accelerating agent and a plasticizing agent.

This accelerating agent improves the adhesion of the adhesive between the substrates. The presence of the accelerating agent is recommendable in the case of porous or deactivating substrates, such as some types of wood, leather, cork, paper, cardboard and the like.

Accelerating agents are well known in prior art and are described, for example, in the U.S. Pat. No. 4,171,416, U.S. Pat. No. 4,837,260, U.S. Pat. No. 4,980,086 and U.S. Pat. No. 4,906,317. The accelerating agents suitable for the adhesive of the present invention are preferably selected from the group consisting of crown ethers, such as, for example, 18-crown-6 ether and dibenzo-18-crown-6 ether; silylated crown ethers; calixarenes tetra-t-butyl esters; and dimethyl ethers of PEG 400, PEG 500, PEG 600 and PEG 1000; more preferably is a crown ether, still more preferably is selected from 18-crown-6 ether and dibenzo-18-crown-6 ether; and still more preferably is dibenzo-18-crown-6.

These accelerating agents are well known to the skilled in the art and are commercially available. For example, crown ethers and calixarenes tetra-t-butyl esters through the company Alfa Aesar, and dimethyl ethers of PEG through the company Sigma Aldrich.

The accelerating agent is usually present in an amount comprised between 0.05% and 0.2% by weight based on the total weight of component A. When the accelerating agent is dibenzo-18-crown-6, it is generally present in an amount comprised between 0.08% and 0.2% by weight, preferably between 0.1% and 0.15% by weight based on the total weight of component A; and when the accelerating agent is 18-crown-6, it is generally present in an amount comprised between 0.05% and 0.15% by weight, preferably between 0.07% and 0.1% by weight based on the total weight of component A.

In the component A, the total percentage of monomers (compounds of formula (I) and (III)) is generally comprised between 85% and 92.5% by weight, preferably between 88% and 91% by weight based on the total weight of component A, when that component does not include a plasticizing agent. In the case that the component A includes a plasticizing agent, the total content of monomers is comprised between 65% and 80% by weight, preferably between 68% and 75% by weight based on the total weight of component A. The compound of general formula (III) usually represents between 0% and 50% by weight based on the total weight of the monomers (compounds of formula (I) and (III)).

A preferred embodiment of component A comprises:

between 85% and 92.5% by weight of the compound of general formula (I), optionally combined with the compound of general formula (III), being the compound of general formula (I) preferably selected from 2-ethoxyethyl cyanoacrylate, 2-methoxyethyl cyanoacrylate, and 2-(1-methoxy)propyl cyanoacrylate;

between 2% and 6% by weight of a thixotropic agent selected from the group consisting of hydrogenated castor oil, hydrogenated castor oil modified by reaction with an amine, and polyamides, wherein where the modified castor oil is preferably the product resulting from the reaction between hydrogenated castor oil and an aliphatic diamine, more preferably selected from the group consisting of 1,2-ethanediamine, 1,3-propanediamine and 1,6-hexanediamine, and still more preferably is 1,2-ethanediamine, or between 3.5% and 5% by weight of silica, preferably hydrophobic fumed silica, between 2% and 8% by weight of a thickener, preferably methyl polymethacrylate, more preferably with an average molecular weight comprised between 400,000 and 500,000.

between 0.03% and 0.7% by weight of a radical stabilizing agent, preferably selected from hydroquinone monomethyl ether, 2,2'-methylene-bis-(6-tert-butyl-4-methylphenol), and mixtures thereof, and between 0.0004% and 0.0012% by weight, equivalent to 4 and 12 ppm respectively, of an acid stabilizing agent, preferably the $BF_3$.etherate complex, between 0.0005% and 0.0018% by weight of methanesulfonic acid, or mixtures thereof, optionally in combination with between 0.0008% and 0.003% by weight of sulfur dioxide.

More preferably, the thixotropic agent is silica, in the quantities and preferences indicated.

This composition may further include a filler, an adhesion promoter, and mixtures thereof as stated above.

In a particularly preferred embodiment, the component A essentially consists of the following components: compound of general formula (I), optionally in combination with a compound of general formula (III), a thickener, a thixotropic agent and a stabilizing agent.

Another preferred embodiment of the component A does not include an inorganic thixotropic agent, and further includes an accelerating agent and a plasticizing agent, and comprises:

between 65% and 80% by weight of the compound of general formula (I), optionally combined with the compound of general formula (III), being the compound of general formula (I) preferably selected from 2-ethoxyethyl cyanoacrylate, 2-methoxyethyl cyanoacrylate, and 2-(1-methoxy)propyl cyanoacrylate, between 2% and 6% by weight of a thixotropic agent selected from the group consisting of hydrogenated castor oil, hydrogenated castor oil modified by reaction with an amine, and polyamides, wherein where the modified castor oil is preferably the product resulting from the reaction between hydrogenated castor oil and an aliphatic diamine, more preferably selected from the group consisting of 1,2-ethanediamine, 1,3-propanediamine and 1,6-hexanediamine, and still more preferably is 1,2-ethanediamine, between 2% and 8% by weight of a thickener, preferably methyl polymethacrylate, more preferably with an average molecular weight comprised between 400,000 and 500,000, between 0.03% and 0.7% by weight of a radical stabilizing agent, preferably selected from hydroquinone monomethyl ether, 2,2'-methylene-bis-(6-tert-butyl-4-methylphenol), and mixtures thereof, between 0.0004% and 0.0012% by weight, equivalent to 4 and 12 ppm respectively, of an acid stabilizing agent, preferably the $BF_3$.etherate complex, between 0.0005% and 0.0018% by weight of methanesulfonic acid, or mixtures thereof, optionally in combination with between 0.0008% and 0.003% by weight of sulfur dioxide, between 10% and 20% of a plasticizing agent selected from the group consisting of esters of $C_2$-$C_4$ carboxylic acids with $C_2$-$C_5$ alkyl alcohols having 2-4 hydroxyl groups, preferably selected from glycerine triacetate and ethylene glycol diacetate, and between 0.08% and 0.2% by weight of an accelerating agent, preferably a crown ether, more preferably selected from the group consisting of dibenzo-18-crown-6 ether and 18-crown-6 ether.

The expressed percentages indicate the weight based on the total weight of component A.

This composition can further include a filler, an adhesion promoter, and mixtures thereof as stated above.

In a particularly preferred embodiment, the component A essentially consists of the following components: compound of general formula (I), optionally in combination with a compound of general formula (III), a thickener, a thixotropic agent, a stabilizing agent, a plasticizing agent and an accelerating agent.

Component B

The component B includes a plasticizing agent, an initiating agent, and a thixotropic agent. It can further include other optional components such as an adhesion promoter, a non-reactive filler, a reactive inorganic filler, a biocide, a pigment or colorant, an accelerating agent, pharmaceutically active ingredients, refreshing agents such as menthol, for example, or mixtures thereof.

Plasticizing Agent

The plasticizers to be used in component B are the same described for component A and with the same preferred embodiments.

The plasticizing agent in component B is usually present in a percentage comprised between 85% and 96% by weight, preferably between 87% and 92% by weight based on the total weight of component B.

Initiating Agent

The use of xanthines, for example, caffeine, as initiating agent in cyanoacrylate compositions of two components is described in, for example, the U.S. Pat. No. 4,042,442 and also in the Spanish patent application P201331566.

The initiating agent of the present invention is selected from the group consisting of xanthines, quaternary ammonium salts, metal salts of carboxylic acids, and mixtures thereof.

Xanthines are compounds that belong to a chemical group denominated purine bases, which includes among others, guanine, adenine, hypoxanthine, caffeine, theobromine and theophylline. Xanthines selected from the group consisting of caffeine and theobromine are preferably used.

The quaternary ammonium salts can also be used as initiators in the component B, choline chloride is preferably used.

The carboxylic acids are preferably selected from monocarboxylic acids having $C_2$-$C_{20}$ linear or branched, saturated or unsaturated chain, preferably acetic acid, 2-ethylhexanoic acid, palmitic acid, and stearic acid; acrylic acid, and methacrylic acid. The metal salts are preferably selected from alkali salts, alkaline earth salts, aluminium salts, and zinc (II) salts, more preferably from lithium, sodium, potassium, calcium, magnesium, barium, aluminium, and zinc salts. Still more preferably, the metal salts are selected from the group consisting of lithium stearate, sodium stearate, potassium stearate, zinc stearate, calcium stearate, magnesium stearate, barium stearate, lithium 2-ethylhexanoate, sodium 2-ethylhexanoate, potassium 2-ethylhexanoate, zinc 2-ethylhexanoate, calcium 2-ethylhexanoate, magnesium 2-ethylhexanoate, barium 2-ethylhexanoate, sodium acetate, calcium acetate, zinc acetate, calcium (meth)acrylate, barium (meth)acrylate, aluminium (meth)acrylate, and zinc (meth) acrylate; more preferably is calcium stearate, barium stearate, calcium acrylate, barium acrylate. The commercial metal salts of stearic acid are generally mixtures of palmitic and stearic acids in different proportions, although the skilled in the art denominates them stearates.

In a particularly preferred embodiment, the initiating agent is selected from the group consisting of caffeine, calcium acrylate, barium acrylate, a combination of caffeine and calcium stearate, a combination of caffeine and calcium acrylate, a combination of caffeine and barium stearate, and a combination of caffeine and barium acrylate.

The initiating agent in component B is usually present in a percentage comprised between 0.15% and 1% by weight, preferably between 0.25% and 0.8% by weight based on the total weight of component B. When a combination of initiators is used comprising a metal salt, it is generally comprised between 0.1% and 0.7% by weight, preferably between 0.2% and 0.6% by weight based on the total weight of component B. Occasionally, the component B may include a salt of a Lewis acid that is generally comprised between 0.05% and 0.2% by weight based on the total weight of the component B.

Thixotropic Agent

The component B comprises a thixotropic agent, organic or inorganic selected from the group consisting of hydrogenated castor oil, hydrogenated castor oil modified by reaction with an amine, polyamides, and silica, as described for the component A, and with the same preferred embodiments.

In component B, the organic thixotropic agent is generally present in an amount comprised between 10% and 15% by weight, preferably between 11% and 13% by weight based on the total weight of component B. The inorganic thixotropic agent, that is, silica, is generally present in an amount comprised between 3% and 10% by weight, preferably between 4% and 9% by weight based on the total weight of component B.

Filler

The component B can also further include a non-reactive filler, like component A, but it can also include a reactive filler, because in component B the polymerizing monomer is not present. Usually, the filler content in component B, when it is non-reactive, is comprised between 3% and 10% by weight, preferably between 4% and 9% by weight based on the total weight of component B. When a reactive inorganic filler is used, such as, for example, PROMAXON® D, described in the Spanish patent application P201331566, it is generally comprised between 0.5% and 3% by weight, more preferably between 1% and 2% by weight based on the total weight of component B.

Adhesion Promoter

Analogously to component A, component B can further include an adhesion promoter for glass, ceramics, porcelain, plastics and/or metal such as, for example, alkoxysilane compounds, citric acid, lithium tetrafluoroborate, lithium hexafluorophosphate, an aromatic carboxylic acid or anhydride or an α-substituted acrylic acid, optionally in form of anhydride. Among the acids and anhydrides can be mentioned trimellitic acid, trimellitic anhydride, pyromellitic acid, pyromellitic anhydride, 3,3',4,4'-benzophenonetetracarboxylic acid dianhydride, itaconic acid, itaconic anhydride, and 3-buten-1,2,3-tricarboxylic acid.

Usually the content of the adhesion promoter in component B is comprised between 0.05% and 0.3% by weight, preferably between 0.06% and 0.2% by weight based on the total weight of component B.

Biocide

The component B can include a biocide to face contamination by microorganisms, moulds and fungi. For this purpose can be used, for example, choline chloride, quaternary ammonium salts, pyridinium salts, optionally in combination with polymeric antifungal compounds as those described, for example, in the U.S. Pat. No. 7,473,474. Usually, combinations of biocides are used to increase the efficacy.

In component B, the biocide is generally present in an amount comprised between 1% and 2% by weight based on the total weight of component B.

Pigment or Colorant

The component B can further include pigments or colorants which are appropriate for sealing applications. Among them may be mentioned titanium dioxide (81X DELITO®, Boud) and black iron oxides (BAYERFERROX® 318A, Bayer).

In the component B, it is generally present in an amount comprised between 1% and 3.5% by weight, preferably between 2% and 2.5% by weight based on the total weight of component B.

Accelerating Agent

The component B can further include an accelerating agent, as described for component A, and with the same particular embodiments.

Component B additionally includes an accelerating agent when component A includes an inorganic thixotropic agent such as, for example, silica.

In component B, the accelerating agent is generally present between 0.03% and 0.2% by weight, preferably between 0.05% and 0.15% by weight based on the total weight of component B.

When component A includes an organic thixotropic agent, the accelerating agent can be present in both the component A and the component B. In this case, the amount of accelerating agent can be divided between the two components A and B, preferably the larger amount is included in the component B, which does not have the polymerizing monomer. Different accelerating agents can also be used in each component in order to adjust the characteristics of use of the adhesive after mixing component A and component B.

A preferred embodiment of component B comprises:
  between 10% and 15% by weight of a thixotropic agent selected from the group consisting of hydrogenated castor oil, hydrogenated castor oil modified by reaction with an amine, and polyamides, wherein the modified castor oil is preferably the product resulting from the reaction between hydrogenated castor oil and an aliphatic diamine, more preferably selected from the group consisting of 1,2-ethanediamine, 1,3-propanediamine and 1,6-hexanediamine, and still more preferably is 1,2-ethanediamine, or between 2% and 10% by weight of silica, preferably hydrophobic fumed silica,
  between 85% and 96% of a plasticizing agent selected from the group consisting of esters of $C_2$-$C_4$ carboxylic acids with $C_2$-$C_5$ alkyl alcohols having 2-4 hydroxyl groups, preferably selected from glycerine triacetate and ethylene glycol diacetate,
  between 0.15% and 1% by weight of an initiating agent selected from the group consisting of xanthines, quaternary ammonium salts, metal salts of carboxylic acids, and mixtures thereof, preferably is selected from the group consisting of caffeine, calcium acrylate, barium acrylate, a combination of caffeine and calcium stearate, a combination of caffeine and calcium acrylate, a combination of caffeine and barium stearate, and a combination of caffeine and barium acrylate.

The expressed percentages indicate the weight based on the total weight of component B.

Furthermore, the component B can include other optional components such as an adhesion promoter, a non-reactive filler, a reactive inorganic filler, a biocide, a pigment or colorant, an accelerating agent, a pharmaceutically active ingredient, refreshing agents such as menthol, for example, or mixtures thereof.

In a preferred embodiment of component B, it essentially consists of a plasticizing agent, an initiating agent, and a thixotropic agent.

Surprisingly, it has been found that when combining a monomer that comprises an alkoxyalkyl type ester with specific plasticizing agents, as those described above, the adhesives obtained form highly elastic materials with elongations at break of at least 200%. These materials recover the initial dimensions once the deformation ceases. The extension of the elongation can be controlled by the structure of the monomer, the incorporation of additional monomers, the selection of the plasticizing agent, and the mixture ratio between the monomer and the plasticizing agent. In this way, the elasticity of the adhesive can be controlled to adapt it to the technical needs of the bonding. Furthermore, the adhesive obtained with these monomers is non-lachrymatory, non-irritating, and its vapours do not polymerize, so it does not form white deposits on the substrates to be bonded, repaired or sealed.

Preparation Method

The usual method for preparing the component A of the invention comprises a first step wherein the radical stabilizer, the acid stabilizer and the adhesion promoter, if present, are mixed with the monomer of general formula (I), optionally mixed with the monomer of formula general (III). The mixture is heated to a temperature comprised between 50° C. and 75° C., preferably 60° C., and the dry and peroxide-free thickening agent is added. The mixture is kept under stirring usually for a period comprised between 60 and 90 min until complete dissolution of the polymer.

Subsequently, it is allowed to cool naturally to room temperature and the thixotropic agent and the rest of additional components, if any, are added and, finally, the acid stabilizer in vapour phase. The adhesive is stored, for example, in stoppered high-density polyethylene bottles.

In some cases, when the organic thixotropic agent is a polyamide, before adding it to the component A, it is washed with a dilute solution of methanesulfonic acid in acetone at 1% by weight/weight, it is rinsed with acetone, and it is dried.

The component B can be prepared by dissolution or dispersion of the initiating agent and of the thixotropic agent in the plasticizing agent at room temperature under stirring for about 20-40 minutes.

Adhesive

Also part of the object of the invention is an adhesive comprising the cyanoacrylate composition.

This adhesive is composed of from 1 to 4 parts of component A and approximately 1 part of component B, preferably 1 part, which are intimately mixed before proceeding to the use of the adhesive, preferably 4 parts of component A and 1 part of component B are combined.

Also part of the object of the invention is a syringe or a cartridge comprising the cyanoacrylate composition.

Preferably the syringe or the cartridge are a syringe or a cartridge with two chambers each of different volume, one for component A and another one for component B. The component A is placed in the chamber of larger volume, because the adhesive is obtained by mixing in volume from 1 to 4 parts of component A and 1 part of component B. The preparation of the adhesive is made by the mixture of component A with component B by hand pressure, or assisted by a gun, on the plungers of the syringe or the cartridge, which forces the content of the chambers, the components A and B, to enter into the static mixer and, thus, at its outlet the adhesive of the invention is obtained. In the adhesive, the two components A and B are intimately mixed.

Bonding, Repair, or Sealing Method and Elastic Material

Also part of the object of the invention is a bonding, repair, or sealing method comprising:
1) combining from 1 to 4 parts by volume of component A of the composition of the invention and 1 part by volume of component B of the composition of the invention,
2) applying this mixture to a joint or on the upper part of a substrate and, optionally
3) assembling a second substrate atop the first substrate.

Also part of the object of the invention is an elastic material obtainable according to this method.

Use of the Cyanoacrylate Composition

Part of the object of the invention is the use the cyanoacrylate composition for bonding substrates, repairing depressions, cracks or holes in a substrate or between substrates and for sealing joints. The composition is suitable for various types of substrates such as, for example, metal (aluminium, steel, . . . ), glass, ceramics, plastics (PVC, ABS, polycarbonate, methyl polymethacrylate, . . . ), stone, rubber, leather, textiles, wood, etc. In particular, the composition of the invention is suitable for repairs and sealings in the car, household objects, sealing of small boxes for components, for bonding parts that may move relative to one another, as in joints of speaker cones, for flexible bonding in leather goods such as handbags, belts, wallets, clothing, industrial fabrics, sports shoes, for shoe repairing, for bonding large surfaces of substrates having different thermal expansion, in which it is not recommendable to use adhesives that generate odours or are lachrymatory. The bonds in leather pieces require an adhesive with high elasticity, odourless, and non-lachrymatory and that do not form white deposits on the substrates, such as the one of the invention. This elasticity allows the simple and durable assembly of leather pieces such as shoulders, sleeves, lapels or collars pieces, without losing the leather flexibility. The use of the instant or fast-curing adhesives of prior art usually results in a rigid and not flexible laminate, and in some cases in the formation of white residues on expensive leather pieces, due to the polymerization of vapours of the adhesive on the substrate.

Application Tests

Application tests of the adhesive of the invention can be made according to methods well known to the skilled on the art. For example, by applying a given amount of the adhesive to a substrate and assembling a second identical substrate atop. The two substrates are clamped with clips and the timer starts. In the context of the invention, the fixture time is the minimum time necessary for the so-bonded substrates, free from clips, to hold a 3 kg weight for a minimum of 10 seconds in a vertical orientation without breaking. Each test is usually repeated at least 3 times. The tensile strength is expressed in MPa (or $N/mm^2$). Peel strength, expressed in N/mm, can also be tested on various substrates, including leather.

The elasticity of the material obtained by curing the composition of the invention can be determined by tests well known to the skilled in the art, for example, % elongation at break relative to the initial length, the mechanical load determined at the sample break and the Young's Modulus calculated from recorded stress-strain test data.

The invention comprises the following embodiments:
1.—A cyanoacrylate composition characterized in that it comprises:

1) a component A comprising:
a. a compound of general formula (I)

   (I)

wherein
A is selected from the group consisting of ON, CO₂Me and CO₂Et, and
D is a group defined by the general formula (II)

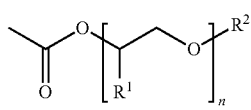   (II)

wherein
R¹ is selected from the group consisting of H and Me,
R² is selected from the group consisting of Si(Me₃)₃, and a $C_1$-$C_6$ linear or branched alkyl chain, and
n is comprised between 1 and 3,
optionally combined with a compound of general formula (III)

   (III)

wherein
E is selected from the group consisting of CN, CO₂Me and CO₂Et, and
G is a carboxylic ester moiety CO₂R3, wherein R³ is selected from the group consisting of: $C_1$-$C_{18}$ linear or branched alkyl chain, trimethylsilylated $C_1$-$C_3$ alkyl chain, allyl, propargyl, cyclohexyl, cyclohexenyl, methylcyclohexyl, methylcyclohexenyl, ethylcyclohexyl, ethylcyclohexenyl, furfuryl, phenylethyl, phenoxyethyl, and acrylic ester moiety.
b. a thickener,
c. a thixotropic agent selected from the group consisting of hydrogenated castor oil, hydrogenated castor oil modified by reaction with an amine, polyamides, and silica,
d. a stabilizing agent, and
2) a component B comprising:
a. a plasticizing agent selected from the group consisting of esters of $C_2$-$C_4$ carboxylic acids with $C_2$-$C_5$ alkyl alcohols having 2-4 hydroxyl groups,
b. an initiating agent, and
c. a thixotropic agent selected from the group consisting of hydrogenated castor oil, hydrogenated castor oil modified by reaction with an amine, polyamides, and silica.

2.—Composition according to embodiment 1, characterized in that in the compound of general formula (I), A is the CN group.

3.—Composition according to embodiment 2, characterized in that R¹ is H and R² is Me or Et.

4.—Composition according to embodiments 2 or 3, characterized in that n is 1.

5.—Composition according to any of embodiments 1 to 4, characterized in that the compound of general formula (I) is 2-methoxyethyl cyanoacrylate, 2-ethoxyethyl cyanoacrylate, or 2 (1-methoxy)propyl cyanoacrylate.

6.—Composition according to any of embodiments 1 to 5, characterized in that in the compound of general formula (III), E is CN, and R³ is selected from the group consisting of: $C_1$-$C_{18}$ linear or branched alkyl chain, trimethylsilylated $C_1$-$C_3$ alkyl chain, cyclohexyl, cyclohexenyl, and furfuryl.

7.—Composition according to embodiment 6, characterized in that R³ is selected from the group consisting of Me, Et, i-Pr, Bu, 2-ethylhexyl, and 2-octyl.

8.—Composition according to any of embodiments 1 to 7, characterized in that the thickener is selected from the group consisting of poly(meth)acrylates, polyvinylpyrrolidones, polyvinyl acetates, partially hydrolyzed polyvinyl acetates, vinyl acetate copolymers, and acylated cellulose polymers.

9.—Composition according to embodiment 8, characterized in that the thickener is methyl polymethacrylate.

10.—Composition according to any of embodiments 1 to 9, characterized in that the thickener is present in a percentage comprised between 2% and 8% by weight based on the total weight of component A.

11.—Composition according to embodiment 1, characterized in that the thixotropic agent is silica selected from the group consisting of fumed silica, hydrophobic fumed silica, hydrophilic fumed silica and precipitated silica.

12.—Composition according to embodiment 11, characterized in that the silica is hydrophobic fumed silica.

13.—Composition according to embodiment 1, characterized in that the thixotropic agent is selected from the group consisting of hydrogenated castor oil, hydrogenated castor oil modified by reaction with an amine, and polyamides.

14.—Composition according to embodiment 13, characterized in that the modified castor oil is the product resulting from the reaction between hydrogenated castor oil and an aliphatic diamine, selected from the group consisting of 1,2-ethanediamine, 1,3-propanediamine and 1,6-hexanediamine.

15.—Composition according to embodiment 1, characterized in that the organic thixotropic agent is present in an amount comprised between 2% and 6% by weight based on the total weight of component A, and the silica is present in an amount comprised between 3.5% and 5% by weight based on the total weight of component A.

16.—Composition according to any of embodiments 1 to 15, characterized in that the stabilizing agent is selected from the group consisting of radical stabilizing agents, acid stabilizing agents, and mixtures thereof.

17.—Composition according to embodiment 16, characterized in that the radical stabilizing agent is selected from the group consisting of 4-methoxyphenol, hydroquinone, hydroquinone monomethyl ether, hydroxytoluene butyl ether, hydroxyanisole butyl ether, 2,2'-methylene-bis-(6-tert-butyl-4-methylphenol), and mixtures thereof.

18.—Composition according to embodiment 16, characterized in that the acid stabilizing agent is selected from the group consisting of methanesulfonic acid, p-toluenesulfonic acid, p-toluenesulfonic acid anhydride, boron trifluoride, boron trifluoride-etherate complex, sulfur dioxide, and mixtures thereof.

19.—Composition according to embodiment 16, characterized in that the content of radical stabilizing agent is comprised between 0.03% and 0.7% by weight, and the content of acid stabilizing agent is comprised between 0.0004% and 0.0037% by weight based on the total weight of component A.

20.—Composition according to embodiment 1, characterized in that it further comprises a non-reactive filler, an adhesion promoter or mixtures thereof.

21.—Composition according to any of embodiments 1 to 20, characterized in that the total percentage of the compounds of general formula (I) and (III) is comprised between 85% and 92.5% by weight based on the total weight of component A.

22. Composition according to embodiment 13, characterized in that it further comprises an accelerating agent and a plasticizing agent.

23.—Composition according to embodiment 22, characterized in that the accelerating agent is selected from the group consisting of crown ethers; silylated crown ethers; calixarenes tetra-t-butyl esters; and dimethyl ethers of PEG 400, PEG 500, PEG 600, and PEG 1000.

24.—Composition according to embodiments 22 or 23, characterized in that the accelerating agent is present in an amount comprised between 0.05% and 0.2% by weight based on the total weight of component A.

25.—Composition according to embodiment 22, characterized in that the plasticizing agent is selected from the group consisting of esters of $C_2$-$C_4$ carboxylic acids with $C_2$-$C_5$ alkyl alcohols having 2-4 hydroxyl groups.

26.—Composition according to embodiment 25, characterized in that the plasticizing agent is glycerine triacetate or ethylene glycol diacetate.

27.—Composition according to any of embodiments 22 to 26, characterized in that the total percentage of the compounds of general formula (I) and (III) is comprised between 65% and 80% by weight based on the total weight of component A.

28.—Composition according to embodiment 1, characterized in that component A comprises:
  between 85% and 92.5% by weight of the compound of general formula (I), optionally combined with the compound of general formula (III),
  between 2% and 6% by weight of a thixotropic agent selected from the group consisting of hydrogenated castor oil, hydrogenated castor oil modified by reaction with an amine, and polyamides, or between 3.5% and 5% by weight of silica,
  between 2% and 8% by weight of a thickener,
  between 0.03% and 0.7% by weight of a radical stabilizing agent, and
  between 0.0004% and 0.0012% by weight, equivalent to 4 and 12 ppm respectively, of an acid stabilizing agent,
wherein the expressed percentages indicate the weight based on the total weight of component A.

29.—Composition according to embodiment 28, characterized in that the thixotropic agent is silica.

30.—Composition according to embodiment 1, characterized in that component A comprises:
  between 65% and 80% by weight of the compound of general formula (I), optionally combined with the compound of general formula (III),
  between 2% and 6% by weight of a thixotropic agent selected from the group consisting of hydrogenated castor oil, hydrogenated castor oil modified by reaction with an amine, and polyamides,
  between 2% and 8% by weight of a thickener,
  between 0.03% and 0.7% by weight of a radical stabilizing agent,
  between 0.0004% and 0.0012% by weight, equivalent to 4 and 12 ppm respectively, of an acid stabilizing agent,
  between 10% and 20% by weight of a plasticizing agent selected from the group consisting of esters of $C_2$-$C_4$ carboxylic acids with $C_2$-$C_5$ alkyl alcohols having 2-4 hydroxyl groups, and
  between 0.08% and 0.2% by weight of an accelerating agent,
wherein the expressed percentages indicate the weight based on the total weight of component A.

31.—Composition according to embodiment 1, characterized in that component B comprises a plasticizing agent selected from glycerine triacetate and ethylene glycol diacetate.

32.—Composition according to embodiment 31, characterized in that the plasticizing agent is present in a percentage comprised between 85% and 96% by weight based on the total weight of component B.

33.—Composition according to embodiment 1, characterized in that the initiating agent is selected from the group consisting of xanthines, quaternary ammonium salts, metal salts of carboxylic acids, and mixtures thereof.

34.—Composition according to embodiment 33, characterized in that the initiating agent is selected from the group consisting of caffeine, calcium acrylate, barium acrylate, a combination of caffeine and calcium stearate, a combination of caffeine and calcium acrylate, a combination of caffeine and barium stearate, and a combination of caffeine barium acrylate.

35.—Composition according to embodiment 1, characterized in that in the component B the organic thixotropic agent is comprised between 10% and 15% by weight based on the total weight of component B, and the inorganic thixotropic agent is comprised between 3% and 10% by weight based on the total weight of component B.

36.—Composition according to embodiment 1, characterized in that component B further includes a component selected from the group consisting on a non-reactive filler, a reactive inorganic filler, an adhesion promoter, a biocide, a pigment or colorant, an accelerating agent, pharmaceutically active ingredients, refreshing agents, or mixtures thereof.

37.—Composition according to embodiment 1, characterized in that component B comprises:
  between 10% and 15% by weight of a thixotropic agent selected from the group consisting of hydrogenated castor oil, hydrogenated castor oil modified by reaction with an amine, and polyamides, or between 2% and 10% by weight of silica,
  between 85% and 96% by weight of a plasticizing agent selected from the group consisting of esters of $C_2$-$C_4$ carboxylic acids with $C_2$-$C_5$ alkyl alcohols having 2-4 hydroxyl groups,
  between 0.15% and 1% by weight of a initiating agent selected from the group consisting of xanthines, quaternary ammonium salts, metal salts of carboxylic acids, and mixtures thereof,
wherein the expressed percentages indicate the weight based on the total weight of component B.

38.—An adhesive characterized in that it comprises the composition of any of embodiments 1 to 37.

39.—Adhesive according to embodiment 38, characterized in that it is composed of from 1 to 4 parts of component A and approximately 1 part of component B.

40.—A syringe or cartridge characterized in that it comprises the composition of any of embodiments 1 to 37.

41.—A bonding, repair or sealing method characterized in that it comprises:

1) combining from 1 to 4 parts by volume of component A and 1 part by volume of component B of the composition of any of embodiments 1 to 37,
2) applying this mixture to a joint or on the upper part of a substrate and, optionally,
3) assembling a second substrate atop the first substrate.

42.—An elastic material obtainable according to the method of embodiment 41.

43.—Use of the composition according to any of embodiments 1 to 37 for bonding substrates, repairing depressions, cracks or holes in a substrate or between substrates, and for sealing joints.

44.—Use according to embodiment 43, characterised in that the composition is used for repairs and sealings in the car, household objects, sealing of small boxes for components, for bonding parts that can move relative to one another, flexible bonding in leather goods such as handbags, belts, wallets, clothing, industrial fabrics, sport shoes, for shoe repairing, and for bonding large surfaces of substrates having different thermal expansion.

Next, several examples of the invention are provided for illustrative but not limitative purposes.

EXAMPLES

Preparative Example: Preparation of Diethylene Glycol Monoethyl Ether Cyanoacrylate (Compound of General Formula (I) Wherein A is CN, and D is COO(CHCH$_2$O)Et)

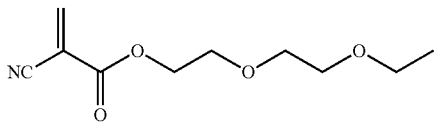

Diethylene glycol monoethyl ether cyanoacetate was prepared by transesterification between ethyl cyanoacetate and diethylene glycol monoethyl ether, as described in the U.S. Pat. No. 4,364,876.

Subsequently, to a 500 ml flask equipped with a magnetic stirrer, were added 100 g (0.5 moles) of diethylene glycol monoethyl ether cyanoacetate and 131.5 g (1 mol) of methylene diacetate, obtained for example according to the method described in the European patent application 14382127. The reaction mixture was heated to 120° C., subsequently 2.1 g (0.025 moles) of piperazine and 23 g (0.075 moles) of linear dodecylbenzenesulfonic acid were added, and it was maintained at this temperature for 2 hours. At that moment, it was monitored by nuclear magnetic resonance that full conversion had been achieved with 80% selectivity, meaning the amount of cyanoacrylate obtained relative to the reacted cyanoacetate. After reaction completion, the acetic acid was removed at 80° C. using a membrane pump for 20 minutes. The obtained residue was stabilized by a conventional stabilizers system before being distilled for obtaining the pure monomer with a yield of the 40%.

Examples 1.1 to 1.12: Component A

Different compositions of the component A of the adhesive of the invention were prepared according to the method described below.

The monomers were directly mixed with the radical and the acid stabilizing agents (with the exception of sulfur dioxide, in case of being present) in a high-density polyethylene container, which previously had been washed with an acid, rinsed with water and dried. The mixture was heated to approximately 60° C. and the thickening agent was added slowly under mechanical stirring, until complete dissolution. Then, the mixture was left to cool to room temperature and the remaining components were added. Finally, the sulfur dioxide was added.

In Tables I and II the components A prepared according to the invention are shown:

TABLE I

| Component | Formulation | | | | | |
| --- | --- | --- | --- | --- | --- | --- |
| | 1.1 | 1.2 | 1.3 | 1.4 | 1.5 | 1.6 |
| Compound of formula (I) | EECA[2] 89.996 | EECA[2] 89.996 | EECA[2] 89.996 | MECA[1] 89.996 | MECA[1] 89.996 | MECA[1] 89.996 |
| Compound of formula (III) | — | — | C6Bis[2] 1.0 | — | — | C6Bis[2] 1 |
| PMMA | 6 | 6 | 6 | 6 | 6 | 6 |
| Hydrophobic fumed silica | 4 | — | 4 | 4 | — | 4 |
| Modified hydrogenated castor oil[3] | — | 5 | — | — | 5 | — |
| MSA | 0.0015 | 0.0015 | 0.0015 | 0.0015 | 0.0015 | 0.0015 |
| Sulfur dioxide | 0.0025 | 0.0025 | 0.0025 | 0.0025 | 0.0025 | 0.0025 |

TABLE II

| Component | Formulation | | | | | |
| --- | --- | --- | --- | --- | --- | --- |
| | 1.7 | 1.8 | 1.9 | 1.10 | 1.11 | 1.12 |
| Compound of formula (I) | MECA[1] 71.446 | MECA[1] 71.446 | MECA[1] 72.446 | MECA[1] 44.495 | MECA[1] 71.345 | PECA[2] 89.996 |
| Compound of formula (III) | TSCA[2] 17.55 | BCA[2] 17.55 | EHCA[2] 17.55 | EHCA[2] 44.495 | — | — |
| PMMA | 6 | 6 | 6 | 6 | 8 | 6 |
| Hydrophobic fumed silica | — | — | 4 | 4 | — | 4 |
| Modified hydrogenated castor oil | 5 | 5 | — | — | 3 | — |
| 18-Dibenzo-crown-6 ether | — | — | — | — | 0.1 | — |
| MBETBP | — | — | — | — | 0.5 | — |
| MEHQ | — | — | — | — | 0.05 | — |
| MSA | 0.0015 | 0.0015 | 0.0015 | 0.0015 | 0.0015 | 0.0015 |
| BF$_3$ | — | — | — | — | 0.001 | — |
| Sulfur dioxide | 0.0025 | 0.0025 | 0.0025 | 0.0025 | 0.0025 | 0.0025 |
| Triacetin | — | — | — | — | 17 | — |

[1]Commercial sample of Henkel Ireland Ltd.
[2]Products prepared according to the method described in the European patent application 14382127.
[3]EFKA ® RM1920

The percentages are expressed by weight based on the total weight of component A.

The abbreviations listed in the tables above refer to the following compounds:
EECA: ethoxyethyl cyanoacrylate
MECA: methoxyethyl cyanoacrylate
PECA: diethyleneglycol monoethyl ether cyanoacrylate
C6Bis: 1,6-hexyl biscyanoacrylate
TSCA: trimethylsilylmethyl cyanoacrylate
BCA: butyl cyanoacrylate
EHCA: 2-ethylhexyl cyanoacrylate
PMMA: poly(methyl methacrylate), (also known as methyl polymethacrylate)

MBETBP: 2,2'-methylene bis(6-tert-butyl-4-methylphenol)
MEHQ: hydroquinone monomethyl ether
MSA: methanesulfonic acid Examples 2.1 a 2.5: Component B Different compositions of component B of the adhesive of the invention were prepared according to the method described below.

The initiating agent and the thixotropic agent were dissolved or dispersed in the plasticizer at room temperature under stirring for approximately 30 minutes.

In the Table III are shown the compositions of component B that were prepared according to the invention:

TABLE III

| Component | Formulation | | | | |
|---|---|---|---|---|---|
| | 2.1 | 2.2 | 2.3 | 2.4 | 2.5 |
| Plasticizer | TGA 93.0 | TGA 95.1 | EG DA 95.1 | TGA 91.0 | TGA 87.2 |
| Initiator | Calcium stearate 0.6 | — | — | — | — |
| Initiator | Caffeine 0.4 | Caffeine 0.4 | Caffeine 0.4 | Caffeine 0.4 | Caffeine 0.4 |
| Hydrophobic fumed silica | 6 | 4.5 | 4.5 | — | — |
| Hydrophilic fumed silica | — | — | — | 8.6 | — |
| Modified hydrogenated castor oil[3] | — | — | — | — | 12.4 |

[3]EFKA ® RM1920

The percentages are expressed by weight based on the total weight of component B.

The abbreviations listed in the above tables refer to the following compounds:
TGA: triacetin (glycerine triacetate)
EGDA: ethylene glycol diacetate Examples 3.1-3.19: Elasticity Tests The application tests of the adhesives of the invention were made by mixing the component A and the component B at a specified ratio, selected from 1:1, 2:1, 4:1 or 10:1, using double-plunger syringes available, for example, through Sulzer Mixpac, Switzerland. The component A was always placed in the chamber of higher volume. The proximal ends of the chambers were closed with respective appropriate pistons immediately after the filling, while the distal ends were capped with a removable stopper before proceeding to filling the chambers. The mixing of component A with component B was performed by removing the caps of the two chambers of the syringe and fitting a nozzle with static mixer elements at the distal end. This nozzle is designed specifically for each syringe, and is supplied as a kit which includes the syringe, the plungers, and the nozzle, through Sulzer Mixpac, Switzerland.

In the bonding tests done the mixing ratio by volume was of 4 parts of component A and 1 part of component B. The adhesive composition resulting from mixing components A and B was dispensed from the tip of the static mixer onto one part of the substrate to be bonded. The second part of the substrate was assembled atop the first bearing the adhesive composition with an overlap area of 250 mm². The two assembled parts were clamped with clips and kept at room temperature for 24 hours, unless otherwise stated. Tensile strength of the assembled parts was determined by destructive testing. Working time (WT), expressed in minutes, usage time (UT), expressed in minutes, were determined and also the average tensile strength was determined on a mild steel substrate after remaining 24 hours at room temperature, expressed in MPa.

To perform the mechanical tests, the adhesive composition resulting from mixing the components A and B was dispensed from the tip of the static mixer into PFTE moulds of 30 mm×10 mm×5 mm, and allowed to set for 24 hours, even if cure was faster than that.

The cured adhesive blocks were trimmed to be uniform and regular if necessary, and were subjected to mechanical testing. The elasticity was measured by % elongation at break relative to the initial length. The mechanical load was recorded at sample break and the Young's Modulus was calculated from recorded stress-strain data.

As discussed above, an elastic behaviour is characterized by a low Young's Modulus and a high percentage of elongation at break.

Table IV shows the tests carried out with the adhesive of the invention, the components A and B used in each case, the mixing ratio, and the results of stress-strain test.

TABLE IV

| Example | Comp. A | Comp. B | A:B | % Elongation | Load (N) | Young's Mod (MPa) |
|---|---|---|---|---|---|---|
| 3.1 | 1.4 | 2.2 | 4:1 | 267 | 167 | 1.61 |
| 3.2 | 1.4 | 2.4 | 4:1 | 307 | 76 | 1.00 |
| 3.3 | 1.4 | 2.5 | 4:1 | 262 | 92 | 1.60 |
| 3.4 | 1.4 | 2.3 | 4:1 | 309 | 30 | 0.70 |
| 3.5 | 1.5 | 2.2 | 4:1 | 326 | 97 | 1.30 |
| 3.6 | 1.11 | 2.2 | 4:1 | 628 | 25 | 0.13 |
| 3.7 | 1.6 | 2.2 | 4:1 | 230 | 172 | 2.37 |
| 3.8 | 1.7 | 2.2 | 4:1 | 220 | 81 | 2.15 |
| 3.9 | 1.8 | 2.2 | 4:1 | 255 | 75 | 1.48 |
| 3.10 | 1.9 | 2.2 | 4:1 | 1020 | 7 | 0.06 |
| 3.11 | 1.10 | 2.2 | 4:1 | 333 | 52 | 0.77 |
| 3.12 | 1.4 | 2.2 | 2:1 | 1047 | 12 | 0.07 |
| 3.13 | 1.4 | 2.2 | 1:1 | 1027 | 2 | 0.06 |
| 3.14 | 1.4 | 2.1 | 1:1 | 619 | 1.5 | 0.04 |
| 3.15 | 1.1 | 2.2 | 4:1 | 1516 | 4 | 0.14 |
| 3.16 | 1.2 | 2.2 | 4:1 | 1093 | 6 | 0.20 |
| 3.17 | 1.1 | 2.2 | 1:1 | —[1] | —[1] | —[1] |
| 3.18 | 1.3 | 2.2 | 4:1 | 367 | 21 | 0.20 |
| 3.19 | 1.12 | 2.2 | 10:1 | —[1] | —[1] | —[1] |

[1]Could not be measured because the material obtained was rubber type.

In these examples it can be observed that elastic materials can be obtained by combining in different proportions the component A and the component B according to the invention, that is, they have a high elongation at break and low Young's Modulus. It is also noted that the use of an organic or inorganic thixotropic agent (examples 3.1 and 3.3, or 3.15 and 3.16), as well as the use of different compounds of general formula (III) in combination with alkoxyalkyl cyanoacrylates (examples 3.7 and 3.11), and different mixing ratios (examples 3.1 and 3.12) leads to elastic materials with different degrees of elasticity.

Comparing the results of examples 3.13 and 3.14, it can be observed that by using two initiating agents, although the curing rate is increased, the degree of elasticity of the material obtained is reduced.

It is also observed that when EECA monomer is used instead of MECA monomer, a greater elasticity is obtained (examples 3.15 and 3.16 vs. 3.1).

By increasing the amount of plasticizer (example 3.1 vs. 3.12), that is, when changing from 4:1 to 2:1 ratio, a more elastic product is obtained, even obtaining a rubber type product (example 3.15 vs. 3.17).

Example 4: Bonding Test

The results shown in Table V illustrate the bonding properties of an odourless and elastic adhesive according to the invention prepared according to Example 3.1 on a variety of substrates:

TABLE V

| Substrates | Pine wood | Beech wood | Mild steel | Stainless steel A316 | Aluminum A5754 | ABS | PC | PVC |
|---|---|---|---|---|---|---|---|---|
| Fixture time (s) | 180 | 9-120 | 60 | 60 | 90 | 45 | 60 | 60 |
| Tensile strength (MPa) | 4.6 | 6.3 | 7.1 | 6.3 | 3.1 | 6.1 | 5.6 | 3.0 |

The abbreviations listed in the tables above refer to the following materials:
ABS=acrylonitrile-butadiene-styrene polymer
PC=polycarbonate
PVC=polyvinyl chloride As it has already been stated in Table IV, this adhesive showed an elongation at break of 267% and a low Young's Modulus of 1.6 MPa.

This adhesive was also subjected to a peel strength test on leather substrates and showed a value of 2.5 N/mm.

The invention claimed is:

1. A cyanoacrylate composition, comprising:
   1) a component A comprising:
      a. a compound of general formula (I)

(I)

wherein
         A is selected from the group consisting of CN, $CO_2Me$ and $CO_2Et$, and
         D is a group defined by the general formula (II)

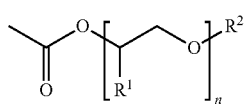

(II)

wherein
         $R^1$ is selected from the group consisting of H and Me,
         $R^2$ is selected from the group consisting of $Si(Me_3)_3$, and a $C_1$-$C_6$ linear or branched alkyl chain, and
         n is between 1 and 3,
      optionally combined with a compound of general formula (III)

(III)

wherein
         E is selected from the group consisting of CN, $CO_2Me$ and $CO_2Et$, and
         G is a carboxylic ester moiety $CO_2R^3$, wherein $R^3$ is selected from the group consisting of: $C_1$-$C_{18}$ linear or branched alkyl chain, trimethylsilylated $C_1$-$C_3$ alkyl chain, allyl, propargyl, cyclohexyl, cyclohexenyl, methylcyclohexyl, methylcyclohexenyl, ethylcyclohexyl, ethylcyclohexenyl, furfuryl, phenylethyl, phenoxyethyl, and acrylic ester moiety,
      b. a thickener,
      c. a thixotropic agent selected from the group consisting of hydrogenated castor oil, hydrogenated castor oil modified by reaction with an amine, polyamides, and silica,
      d. a stabilizing agent, and
   2) a component B comprising:
      a. a plasticizing agent selected from the group consisting of esters of $C_2$-$C_4$ carboxylic acids with $C_2$-$C_5$ alkyl alcohols having 2-4 hydroxyl groups,
      b. an initiating agent, and
      c. a thixotropic agent selected from the group consisting of hydrogenated castor oil, hydrogenated castor oil modified by reaction with an amine, polyamides, and silica.

2. The composition according to claim 1, wherein the compound of general formula (I) is 2-methoxyethyl cyanoacrylate, 2-ethoxyethyl cyanoacrylate, or 2-(1-methoxy)propyl cyanoacrylate.

3. The composition according to claim 1, wherein the thickener is selected from the group consisting of poly(meth)acrylates, polyvinylpyrrolidones, polyvinyl acetates, partially hydrolysed polyvinyl acetates, vinyl acetate copolymers, and acylated cellulose polymers.

4. the composition according to claim 1, wherein the thixotropic agent of component A and/or component B is silica selected from the group consisting of fumed silica, hydrophobic fumed silica, hydrophilic fumed silica and precipitated silica.

5. The composition according to claim 1, wherein the thixotropic agent of component A and/or component B is selected from the group consisting of hydrogenated castor oil, hydrogenated castor oil modified by reaction with an amine, and polyamides.

6. The composition according to claim 5, further comprising an accelerating agent and a plasticizing agent.

7. The composition according to claim 6, wherein the accelerating agent is selected from the group consisting of crown ether, silylated crown ethers; calixarenes; tetra-t-butyl esters; and dimethyl ethers of PEG 400, PEG 500, PEG 600 and PEG 1000.

8. The composition according to claim 6, wherein the plasticizing agent is selected from the group consisting of esters of $C_2$-$C_4$ carboxylic acids with $C_2$-$C_5$ alkyl alcohols having 2-4 hydroxyl groups.

9. The composition according to claim 1, wherein the stabilizing agent is selected from the group consisting of radical stabilizing agents, acid stabilizing agents, and mixtures thereof.

10. The composition according to claim 1, wherein the component B comprises a plasticizing agent selected from glycerine triacetate and ethylene glycol diacetate.

11. The composition according to claim 1, wherein the initiating agent is selected from the group consisting of xanthines, quaternary ammonium salts, metal salts of carboxylic acids, and mixtures thereof.

12. The composition of claim 1, wherein the composition forms an adhesive.

13. A bonding, repair, or sealing method that comprises:
1) combining from 1 to 4 parts by volume of component A and 1 part by volume of component B of the composition of claim 1,
2) applying this mixture to a joint or on an upper part of a first substrate and, optionally
3) assembling a second substrate atop the first substrate.

14. The method of claim 13, wherein an elastic material is formed.

15. An adhesive that comprises the composition of claim 1.

* * * * *